US012686016B2

(12) United States Patent
Aimono et al.

(10) Patent No.: US 12,686,016 B2
(45) Date of Patent: Jul. 21, 2026

(54) LIQUID EJECTING HEAD AND LIQUID EJECTING APPARATUS

(71) Applicant: SEIKO EPSON CORPORATION, Tokyo (JP)

(72) Inventors: Takanori Aimono, Matsumoto (JP); Siyuan Xu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 610 days.

(21) Appl. No.: 18/155,859

(22) Filed: Jan. 18, 2023

(65) Prior Publication Data

US 2023/0226563 A1 Jul. 20, 2023

(30) Foreign Application Priority Data

Jan. 19, 2022 (JP) ................................ 2022-006217

(51) Int. Cl.
*B05B 1/04* (2006.01)
*B05B 1/06* (2006.01)
*B05B 9/04* (2006.01)

(52) U.S. Cl.
CPC ................ *B05B 1/048* (2013.01); *B05B 1/06* (2013.01); *B05B 9/0403* (2013.01)

(58) Field of Classification Search
CPC .......... B05B 1/048; B05B 1/06; B05B 9/0403
USPC ............................ 239/102.1–102.2, 124–127
See application file for complete search history.

(56) References Cited

U.S. PATENT DOCUMENTS 6,726,130 B2 * 4/2004 Jaubertie .................. B24C 5/04 239/592
7,651,037 B2 * 1/2010 Drury .................. B41J 2/04501 239/562
2008/0291244 A1 11/2008 Koizumi et al.
2017/0259563 A1 9/2017 Ozawa
2020/0376837 A1 12/2020 Asami et al.
2021/0122158 A1 4/2021 Taniuchi et al.
(Continued)

FOREIGN PATENT DOCUMENTS

JP 2009006704 1/2009
JP 2017159565 9/2017
JP 2020-192780 A 12/2020
(Continued)

*Primary Examiner* — Steven M Cernoch
(74) *Attorney, Agent, or Firm* — WORKMAN NYDEGGER

(57) ABSTRACT

A liquid ejecting head includes a nozzle. A sectional shape at a first-position in the nozzle in an ejection-direction is a first-external-shape, and a straight line extending in a second-direction orthogonal to both the ejection-direction and a first-direction being a longitudinal-direction of the first-external-shape and passing through a center of the first-external-shape in the first-direction is a first-center-line. A first-width corresponding to a maximum width in the second-direction in a portion of the first-external-shape on one side in the first-direction with respect to the first-center-line is at a third-position in the first-direction. A second-width corresponding to a maximum width in the second-direction in a portion of the first-external-shape on the other side in the first-direction with respect to the first-center-line is at a fourth-position in the first-direction. A distance between the third-position and the fourth-position is greater than the first-width and the second-width.

12 Claims, 13 Drawing Sheets

(56) References Cited

U.S. PATENT DOCUMENTS

| | | | | |
|---|---|---|---|---|
| 2021/0253881 A1 * | 8/2021 | Harris | ...................... | B41J 2/215 |

FOREIGN PATENT DOCUMENTS

| | | |
|---|---|---|
| JP | 2021-066159 A | 4/2021 |
| JP | 2021165027 | 10/2021 |

* cited by examiner

LIQUID EJECTING HEAD AND LIQUID EJECTING APPARATUS

The present application is based on, and claims priority from JP Application Serial Number 2022-006217, filed Jan. 19, 2022, the disclosure of which is hereby incorporated by reference herein in its entirety.

BACKGROUND

1. Technical Field

The present disclosure relates to a liquid ejecting head and a liquid ejecting apparatus.

2. Related Art

JP-A-2021-66159 discloses a liquid ejecting head in which a nozzle has a two-stage structure where a nozzle has such a shape that two arcs partially overlap each other at a position close to an opening end. Since the liquid ejecting head enables liquid to be less likely to remain in the nozzle, it is possible to reduce the potential for ejection failure due to residual liquid.

However, the inventors of the disclosure found a problem that the nozzle shape described in the related art causes liquid droplets to be ejected individually from the two arcs, and liquid droplets may be attached to a medium in a split state. Thus, a technique capable of reducing a possibility of liquid droplets landing on a medium in a split state is desired.

SUMMARY (1) According to a first aspect of the disclosure, a liquid ejecting head including a driving element that generates pressure for ejecting a liquid, and a nozzle that ejects the liquid in an ejection direction by the pressure generated by the driving element is provided. A certain position in the nozzle in the ejection direction is a first position, a sectional shape of the nozzle in a direction perpendicular to the ejection direction at the first position is a first external shape, a longitudinal direction of the first external shape, which is orthogonal to the ejection direction, is a first direction, a direction orthogonal to both the ejection direction and the first direction is a second direction, and a straight line extending in the second direction and passing through a center of the first external shape in the first direction is a first center line. A first width corresponding to a maximum width in the second direction in a portion of the first external shape on one side in the first direction with respect to the first center line is at a third position serving as a certain position in the first direction, a second width corresponding to a maximum width in the second direction in a portion of the first external shape on the other side in the first direction with respect to the first center line is at a fourth position serving as a certain position in the first direction, and a first distance between the third position and the fourth position in the first direction is greater than the first width and greater than the second width.

(2) According to a second aspect of the disclosure, a liquid ejecting head including a driving element that generates pressure for ejecting a liquid, and a nozzle that ejects the liquid in an ejection direction by the pressure generated by the driving element is provided. A certain position in the nozzle in the ejection direction is a first position, and a sectional shape of the nozzle in a direction perpendicular to the ejection direction at the first position is a first external shape. The first external shape includes a first arc, a second arc, and a connecting portion that couples the first arc and the second arc. A second distance between a center of a first virtual circle of a perfect circle or an ellipse, a portion of a circumference of which is formed by the first arc, and a center of a second virtual circle of a perfect circle or an ellipse, a portion of a circumference of which is formed by the second arc, is greater than a diameter of the first virtual circle, which is measured in a first direction in which the first arc and the second arc are arranged, and a width of the connecting portion, which is measured in a second direction orthogonal to both the first direction and the ejection direction, is less than a diameter of the first virtual circle, which is measured in the second direction.

DESCRIPTION OF EXEMPLARY EMBODIMENTS

A. First Embodiment

Figure 1:
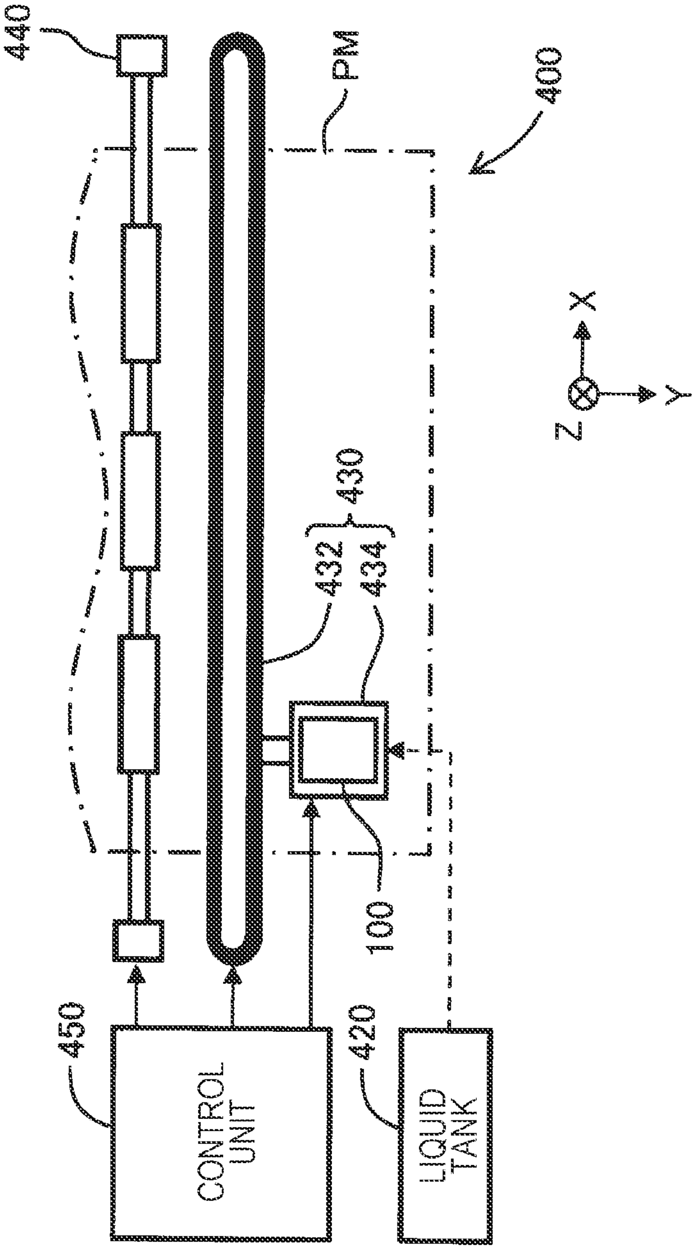
FIG. 1 is a diagram illustrating a configuration of a liquid ejecting apparatus according to an embodiment.

FIG. 1 is a diagram illustrating a configuration of a liquid ejecting apparatus 400 according to an embodiment. The liquid ejecting apparatus 400 is an ink jet printing apparatus that ejects ink, which is an example of a liquid, onto a medium PM. A composition of the ink is not particularly limited, and an aqueous ink in which a coloring material, such as dye or pigment, is dissolved in an aqueous solvent, a solvent-based ink in which a coloring material is dissolved in an organic solvent, or a UV-curable ink, for example, may be used. The liquid ejecting apparatus 400 may eject a coating material as liquid instead of ink. A liquid tank 420 in which ink is stored is attachable to the liquid ejecting apparatus 400. The liquid ejecting apparatus 400 performs printing by ejecting the ink in the liquid tank 420 onto the medium PM. The liquid ejecting apparatus 400 includes a liquid ejecting head 100, a moving mechanism 430, a transport mechanism 440, and a control unit 450.

The liquid ejecting head 100 includes a plurality of nozzles and causes the plurality of nozzles to eject liquid ink supplied from the liquid tank 420. Examples of a specific aspect of the liquid tank 420 include containers such as a cartridge detachably attached to the liquid ejecting apparatus 100, a bag-like ink pack formed from a flexible film, and an ink tank that is able to be replenished with ink. The ink ejected from the nozzles lands on the medium PM. The medium PM is typically a printing sheet. Note that the medium PM is not limited to a printing sheet and may be any printing object made from a resin film, fabric, or the like.

The moving mechanism 430 includes an endless belt 432 and a carriage 434 fixed to the belt 432. The carriage 434 holds the liquid ejecting head 100. The moving mechanism 430 enables the liquid ejecting head 100 to be reciprocated in the X direction by rotating the endless belt 432 in two directions.

The transport mechanism 440 transports the medium PM in the Y direction while the moving mechanism 430 moves the liquid ejecting head 100 multiple times. The Y direction is orthogonal to the X direction. In the present embodiment, the X direction and the Y direction are horizontal directions. The Z direction is perpendicular to the X direction and the Y direction and is a vertically downward direction. The liquid ejecting head 100 ejects ink in the Z direction while being transported in the X direction. The Z direction is also referred to as "ejection direction Z". Moreover, in the following description, the tip of an arrow indicating the X direction in the drawings corresponds to the +X side, the tail of the arrow indicating the X direction in the drawings corresponds to the −X side, the tip of an arrow indicating the Y direction in the drawings corresponds to the +Y side, the tail of the arrow indicating the Y direction in the drawings corresponds to the −Y side, the tip of an arrow indicating the Z direction in the drawings corresponds to the +Z side, and the tail of the arrow indicating the Z direction in the drawings corresponds to the −Z side.

The control unit 450 controls an ink ejection operation of the liquid ejecting head 100. The control unit 450 controls the transport mechanism 440, the moving mechanism 430, and the liquid ejecting head 100 to form an image on the medium PM.

Figure 2:
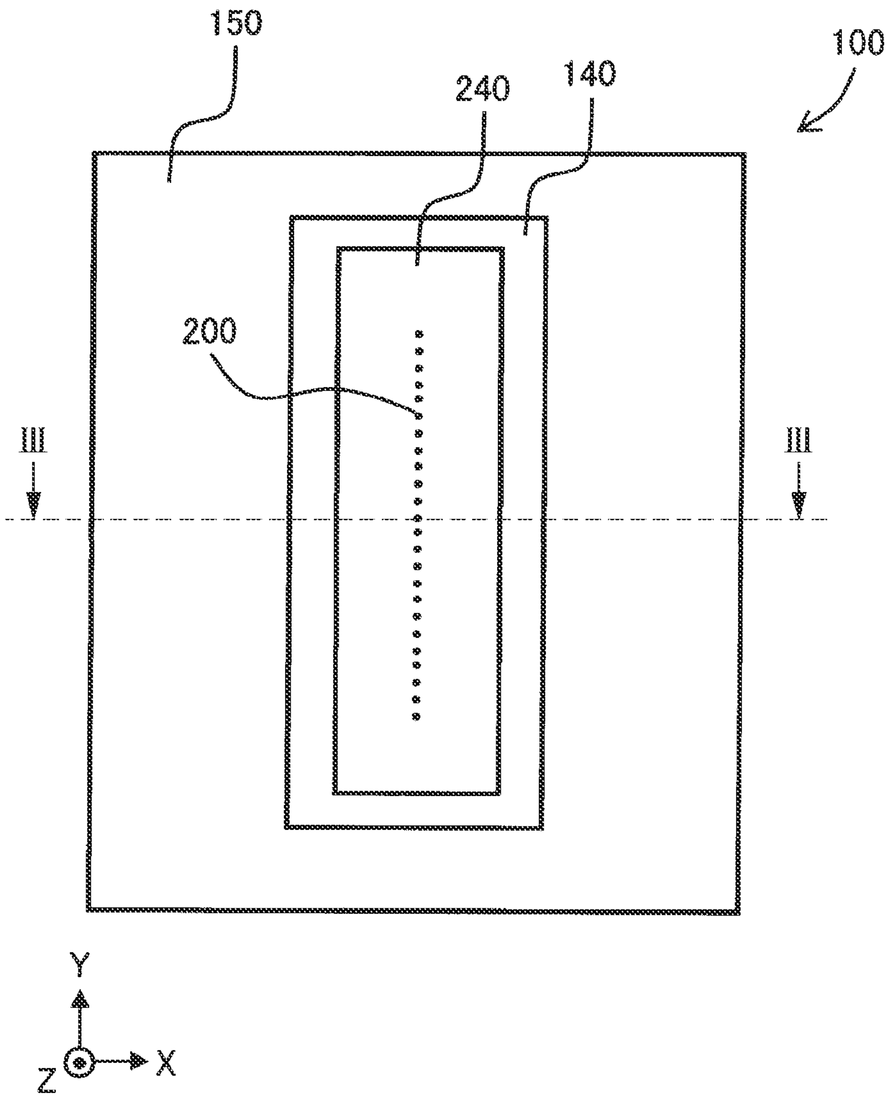
FIG. 2 is a bottom view of a liquid ejecting head.

FIG. 2 is a bottom view of the liquid ejecting head 100. The liquid ejecting head 100 includes a plurality of nozzles 200. The plurality of nozzles 200 are formed so as to pass through a nozzle plate 240, which is arranged parallel to the XY plane, and are linearly arranged in the Y direction.

Figure 3:
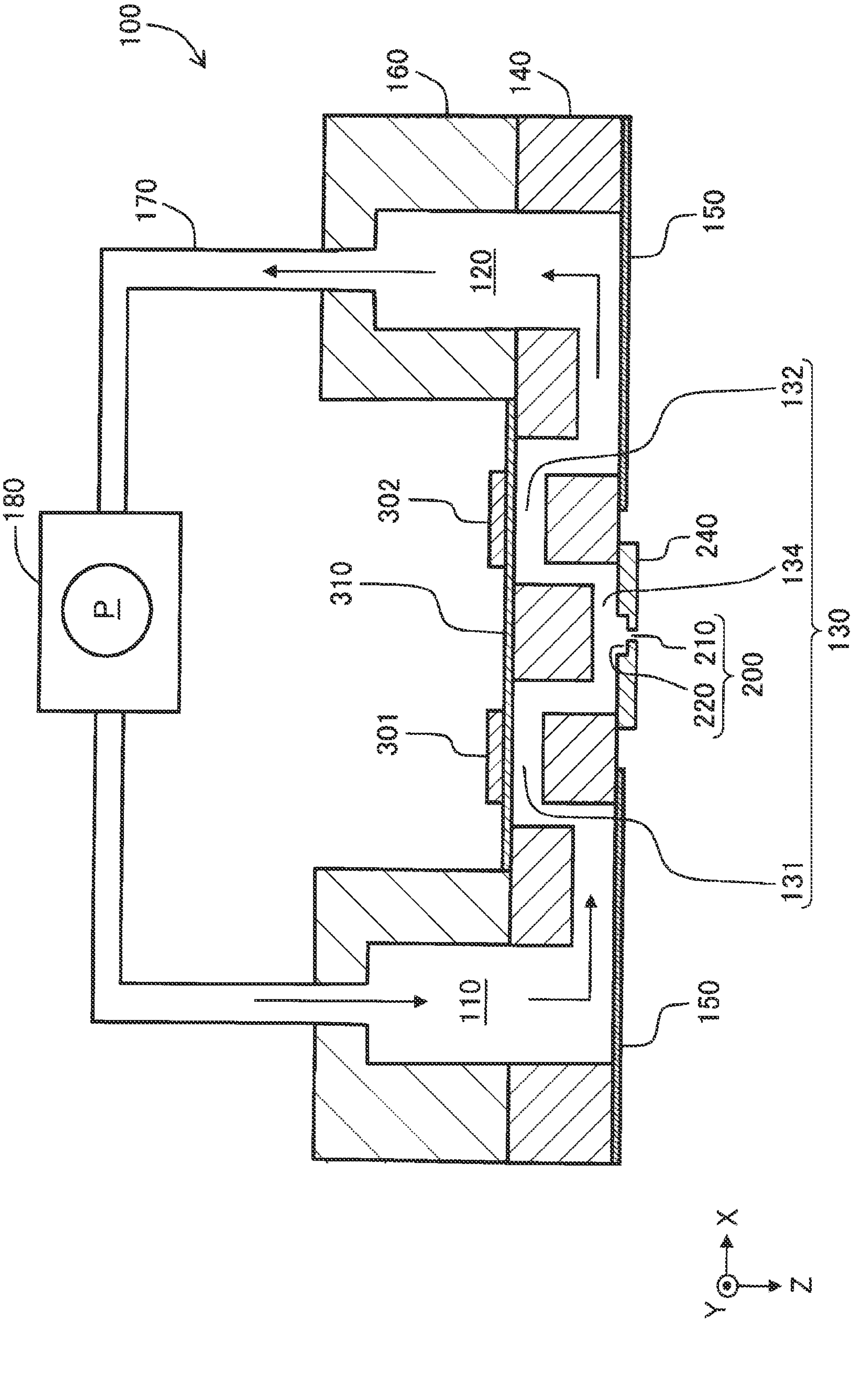
FIG. 3 is a sectional view taken along line III-III in FIG. 2.

FIG. 3 is a sectional view taken along line III-III in FIG. 2. The liquid ejecting head 100 includes a first common liquid chamber 110 to which ink is supplied, a second common liquid chamber 120 from which ink is discharged, and a coupling channel 130 that couples the first common liquid chamber 110 and the second common liquid chamber 120. The coupling channel 130 includes a first pressure chamber 131, a second pressure chamber 132, and a communication channel 134 that enables the two pressure chambers 131 and 132 to communicate with each other. The first common liquid chamber 110 and the second common liquid chamber 120 are provided in common to the plurality of nozzles 200, and the coupling channel 130 is provided for each of the nozzles 200. A lower portion of the first common liquid chamber 110, a lower portion of the second common liquid chamber 120, and the coupling channel 130 are formed mainly by a communication plate 140. Note that the communication plate 140 may be formed by layering a plurality of substrates. A channel substrate 160 is installed on the upper surface of the communication plate 140. The nozzle plate 240 is installed on the lower surface of the communication plate 140, and lower ends of the first common liquid chamber 110 and the second common liquid chamber 120 are sealed by a flexible sealing film 150. Respective openings positioned at upper ends of the first common liquid chamber 110 and the second common liquid chamber 120 are coupled to an external circulation channel 170. The circulation channel 170 is provided with a circulation mechanism 180 including a pump. Ink is supplied from the circulation channel 170 to the first common liquid chamber 110, and after part of the ink is ejected from the nozzles 200 to the outside, ink is discharged from the second common liquid chamber 120 to the circulation channel 170. The liquid tank 420 may be provided halfway in the circulation channel 170 to form a portion of the circulation mechanism 180 or may be provided independently from the circulation mechanism 180 and coupled to the circulation channel 170 to supply liquid to the circulation channel 170. However, the circulation mechanism 180 may be omitted.

The communication channel 134 extends in the X direction, and the nozzles 200 are arranged halfway in the communication channel 134. In the present embodiment, the longitudinal direction of the communication channel 134 corresponds to the X direction but may correspond to a direction intersecting the X direction. A first driving element 301 is disposed for the first pressure chamber 131, and a second driving element 302 is disposed for the second pressure chamber 132. The first driving element 301 and the second driving element 302 are each constituted by, for example, a piezoelectric element. A piezoelectric element is constituted by, for example, a piezoelectric layer and two electrodes provided so as to hold the piezoelectric layer. A vibrating plate 310 is disposed between the first driving element 301 and the first pressure chamber 131 and between the second driving element 302 and the second pressure chamber 132. When the driving elements 301 and 302 that are piezoelectric elements vibrate, vibration thereof is transmitted to the pressure chambers 131 and 132, and a pressure wave is generated in the pressure chambers 131 and 132. Ink is ejected from the nozzle 200 by the pressure generated by the driving elements 301 and 302. When the ink is ejected from the nozzles 200, the first driving element 301 and the second driving element 302 are desirably driven at the same phase at the same time. Note that, instead of piezoelectric elements, heating elements that heat the ink in the pressure chambers 131 and 132 may be used as the driving elements.

In the example illustrated in FIG. 3, although the two pressure chambers 131 and 132 are provided for a single nozzle, the number of pressure chambers may be one or three or more. In any case, a driving element is provided so as to correspond to an individual pressure chamber.

Figure 4:
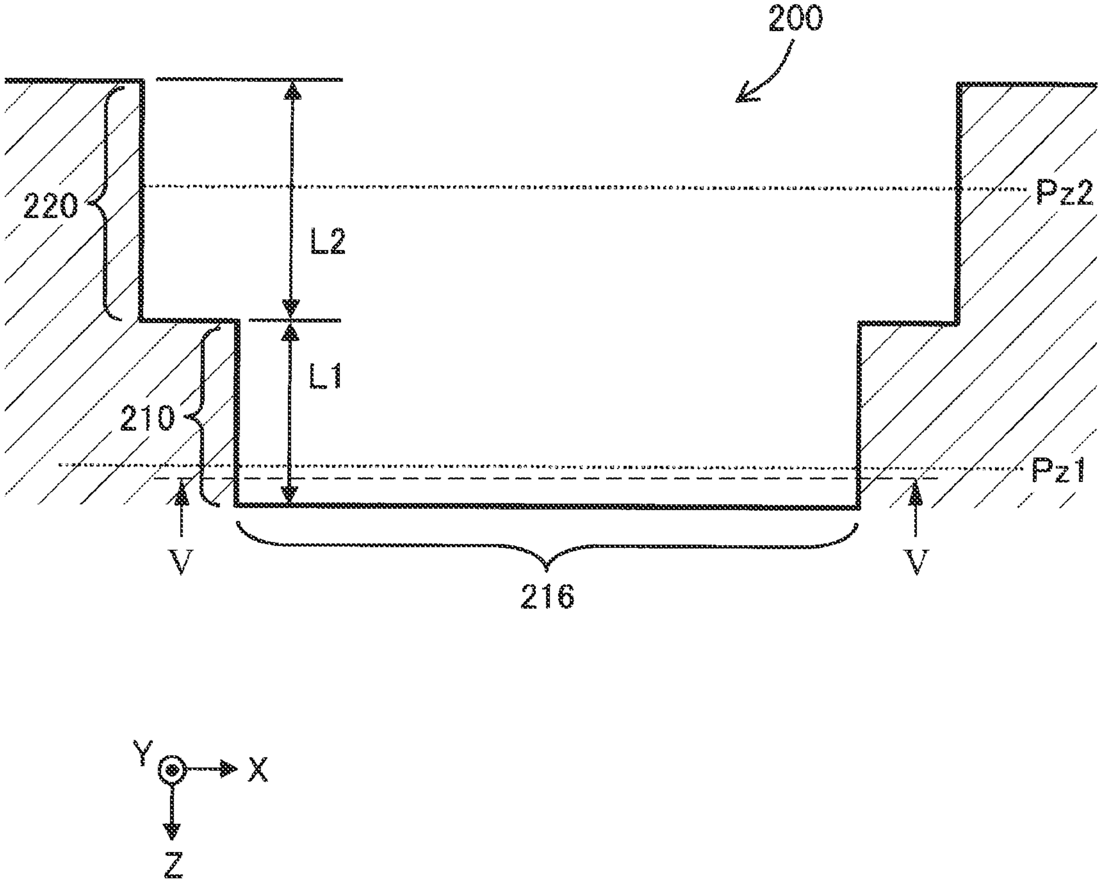
FIG. 4 illustrates a sectional shape of a nozzle according to a first embodiment in an enlarged manner.

FIG. 4 illustrates a sectional shape of a nozzle 200 according to a first embodiment in an enlarged manner. The nozzle 200 includes a first portion 210 and a second portion 220 in the Z direction. The first portion 210 is provided at a position downstream of the second portion 220 in the ejection direction Z, that is, a position closer to a nozzle opening 216. The first portion 210 has a depth L1, and the second portion 220 has a depth L2. A shape of the first portion 210 in a cross section perpendicular to the ejection direction Z is desirably constant regardless of a position Pz1 in the ejection direction Z. A shape of the second portion 220 in the cross section perpendicular to the ejection direction Z is also desirably constant regardless of a position Pz2 in the ejection direction Z. The depth L2 of the second portion 220 is desirably greater than the depth L1 of the first portion 210. When L1<L2, there is an advantage that entrainment of air bubbles is easily prevented after ink ejection. Hereinafter, the shape of the first portion 210 is simply referred to as "first external shape 210", and the shape of the second portion 220 is simply referred to as "second external shape 220".

Figure 5:
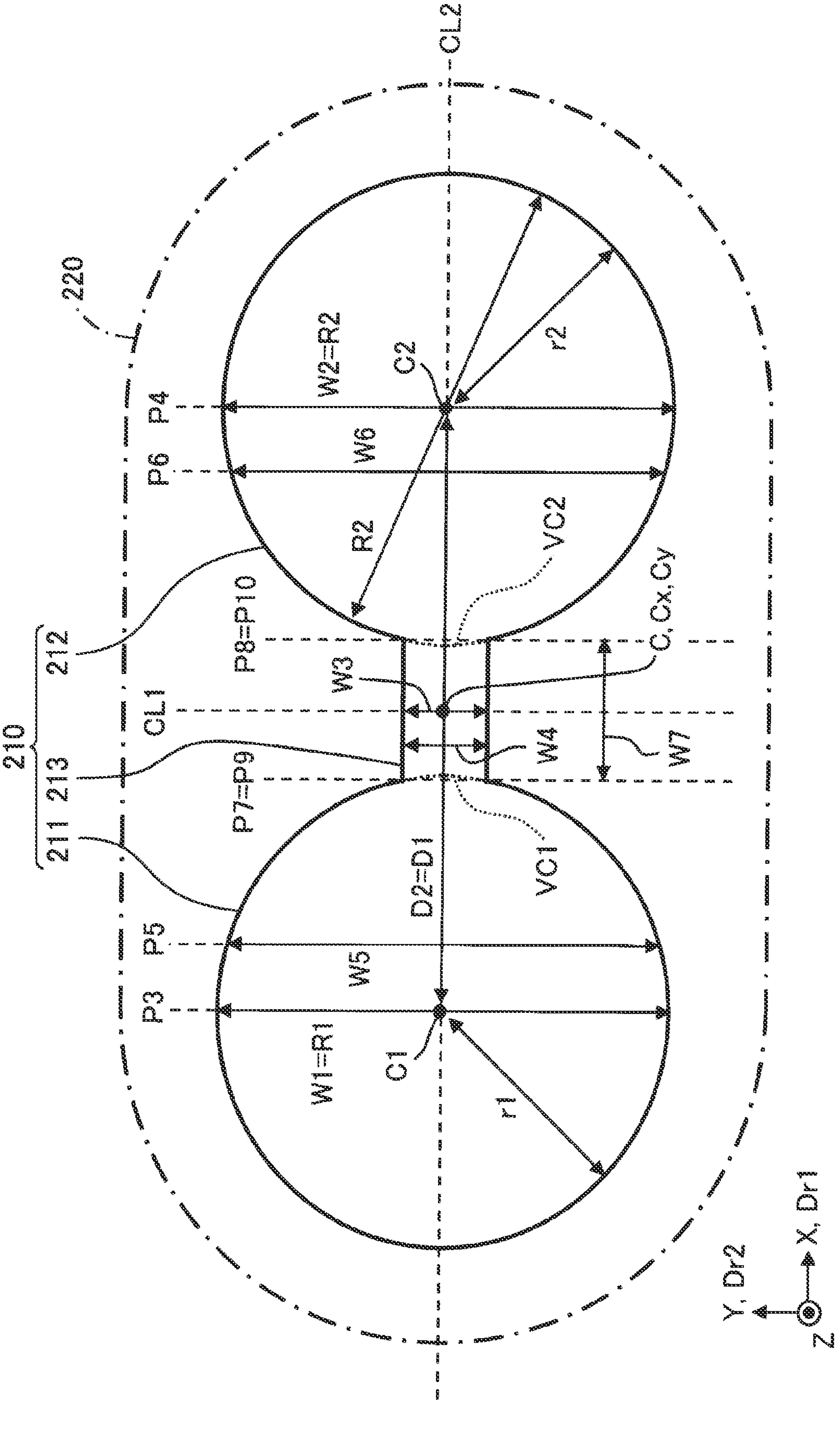
FIG. 5 illustrates a nozzle shape according to the first embodiment, which is taken along line V-V in FIG. 4.

FIG. 5 illustrates a nozzle shape according to the first embodiment, which is taken along line V-V in FIG. 4. In the drawing, for convenience of illustration, the second external shape 220 is indicated by the one-dot chain line, and a first virtual circle VC1 and a second virtual circle VC2, which will be described below, are each indicated by the dotted line. The same applies to other drawings described below.

The first external shape 210 corresponds to a nozzle shape in the cross section perpendicular to the ejection direction Z at the first position Pz1 in FIG. 4, that is, the first position Pz1 serving as a certain position in the nozzle 200 in the ejection direction Z. The first external shape 210 includes a first arc 211, a second arc 212, and a connecting portion 213 by which the first arc 211 and the second arc 212 are coupled. The first external shape 210 has a dumbbell-like shape. That is, the first arc 211 and the second arc 212 are arranged at positions not overlapping each other and are connected by the rectangular connecting portion 213. The first virtual circle VC1, a portion of the circumference of which is formed by the first arc 211, and the second virtual circle VC2, a portion of the circumference of which is formed by the second arc 212, are each desirably a perfect circle or an ellipse, more desirably a perfect circle. In the disclosure, "perfect circle" refers to a circle in which a value obtained by dividing the shortest diameter by the longest diameter is equal to or more than 0.9. Moreover, "circle" is used as a term including a perfect circle, an ellipse, and a rectangle with rounded ends. Note that the first arc 211 and the second arc 212 desirably have a congruent shape and are desirably symmetrical about a center line CL1 of the first external shape 210. As in the present embodiment, the first arc 211 and the second arc 212 are desirably arranged in the X direction, which is a longitudinal direction of the communication channel 134.

The second external shape 220 corresponds to a nozzle shape in the cross section perpendicular to the ejection direction Z at the second position Pz2 in FIG. 4, that is, the second position Pz2 serving as a certain position in the nozzle 200 in the ejection direction Z. The second external shape 220 has an oval shape. In the disclosure, "oval shape" is used as a term including a rectangle with rounded ends, an ellipse, and an egg shape. The second external shape 220 may be set to a shape other than an oval shape. Note that the second external shape 220 is desirably set to have a size in which the first external shape 210 is included.

The connecting portion 213 has a rectangular shape in the present embodiment. However, neither a side corresponding to a portion coupling the connecting portion 213 and the first arc 211 nor a side corresponding to a portion coupling the connecting portion 213 and the second arc 212 exists. Accordingly, the connecting portion 213 in FIG. 5 is indicated by only two sides parallel to each other in the X direction.

In this manner, since the connecting portion 213 is provided between the first arc 211 and the second arc 212, it is able to reduce a possibility of liquid droplets landing on a medium in a split state, which is the problem in the related art. In the related art, a nozzle shape at a position close to an opening end of the nozzle is formed such that two arcs partially overlap each other, and liquid droplets may split into two. This is because liquid droplets are considered to be ejected in a direction in which the liquid droplets separate from each other at the timing of being ejected from the nozzle. On the other hand, as a result of an experiment conducted by the inventors of the disclosure, it was found that it is possible to reduce a possibility of liquid landing on the medium PM in a state of being split into a plurality of liquid droplets by providing the connecting portion 213 between the first arc 211 and the second arc 212 that are separate from each other as illustrated in FIG. 5. One cause of the above is considered to be the capillary force of liquid in the connecting portion 213 being applied such that the liquid in the first arc 211 and the liquid in the second arc 212 attract each other. At this time, a second distance D2 between a center C1 of the first virtual circle VC1 and a center C2 of the second virtual circle VC2, that is, a center-to-center distance D2 between the first arc 211 and the second arc 212, has a value greater than a diameter R1 of the first arc 211 and a diameter R2 of the second arc 212, that is, the diameter R1 of the first virtual circle VC1 and the diameter R2 of the second virtual circle VC2. Since the first virtual circle VC1 and the second virtual circle VC2 in the present embodiment are each a perfect circle, the diameter R1 of the first virtual circle VC1, which is measured in a first direction Dr1 described below, is equal to the diameter R1 of the first virtual circle VC1, which is measured in a second direction Dr2 described below. The same applies to the second virtual circle VC2.

The diameter R1 of the first arc 211 and the diameter R2 of the second arc 212 are desirably, for example, from 20 μm to 30 μm. To reduce a possibility of liquid droplets landing on the medium PM in a split state, a value of R1/D2 obtained by dividing the diameter R1 of the first arc 211 by the second distance D2 serving as the center-to-center distance between the two arcs 211 and 212 is desirably equal to or more than 0.775. Similarly, a value of R2/D2 obtained by dividing the diameter R2 of the second arc 212 by the second distance D2 serving as the center-to-center distance between the two arcs 211 and 212 is also desirably equal to or more than 0.775.

The depth L1 of the first portion 210 illustrated in FIG. 4 is desirably, for example, from 10 μm to 40 μm. To reduce a possibility of liquid droplets landing on the medium PM in a split state, a value of L1/L2 obtained by dividing the depth L1 of the first portion 210 by the depth L2 of the second portion 220 is desirably from 0.2 to 1.2.

Viscosity of the ink is desirably from 3 mPa·s to 20 mPa·s at 25° C. Note that the ink may have a viscosity of 110 mPa·s or less at 25° C. Further, the ink desirably has a surface tension of 20 mN/m to 40 mN/m at 25° C. Use of ink having such properties is able to further enhance the effect of reducing a possibility of liquid landing on the medium PM in a split state.

In FIGS. 4 and 5, regarding the shape of the nozzle 200, the following directions, positions, and dimensions are indicated by reference numerals.

Directions Dr1 and Dr2

The first direction Dr1 is a longitudinal direction of the first external shape 210. The second direction Dr2 is orthogonal to both the ejection direction Z and the first direction Dr1. In the present embodiment, the first direction Dr1 is parallel to the X direction, and the second direction Dr2 is parallel to the Y direction.

Centers C, Cx, and Cy

A center C is the center of the first external shape 210. The position of the center C in the X direction is denoted by Cx, and the position of the center C in the Y direction is denoted by Cy.

Centers C1 and C2

The first center C1 is the center of the first arc 211. The second center C2 is the center of the second arc 212. The first center C1 can be regarded as the center of the first virtual circle VC1, a portion of the circumference of which is formed by the first arc 211. Similarly, the second center C2 can be regarded as the center of the second virtual circle VC2, a portion of the circumference of which is formed by the second arc 212. The virtual circles VC1 and VC2 are each desirably a perfect circle or an ellipse, more desirably a perfect circle.

Center Lines CL1 and CL2

The first center line CL1 is a straight line extending in the second direction Dr2 and passing through the center position Cx of the first external shape 210 in the first direction Dr1. A second center line CL2 is a straight line extending in the first direction Dr1 and passing through the center position Cy of the first external shape 210 in the second direction Dr2. In the present embodiment, the first center line CL1 is parallel to the Y direction, and the second center line CL2 is parallel to the X direction.

Positions P1 to P10

As illustrated in FIG. 4, the first position Pz1 is a certain position in the nozzle 200 in the ejection direction Z and a position in a portion having the first external shape 210 in the cross section of the nozzle 200. Note that the first position Pz1 may be a position at which a tip end of the nozzle 200 on the ejection direction Z side, that is, the nozzle opening 216, is formed.

As illustrated in FIG. 4, the second position Pz2 is a certain position upstream of the first position Pz1 in the nozzle 200 in the ejection direction Z and a position in a portion having the second external shape 220 in the cross section of the nozzle 200.

As illustrated in FIG. 5, a third position P3 is a certain position at which the first external shape 210 has a maximum width measured in the second direction Dr2 in a portion of the first external shape 210 on one side in the first direction Dr1, that is, the −X side, with respect to the first center line CL1. In the present embodiment, a width W1 of the first arc 211 in the second direction Dr2 has a maximum value at the third position P3.

A fourth position P4 is a certain position at which the first external shape 210 has a maximum width measured in the second direction Dr2 in a portion of the first external shape 210 on the other side in the first direction Dr1, that is, the +X side, with respect to the first center line CL1. In the present embodiment, a width W2 of the second arc 212 in the second direction Dr2 has a maximum value at the fourth position P4.

A fifth position P5 is a certain position between the first center line CL1 and the third position P3. A width of the first external shape 210 in the second direction Dr2 at the fifth position P5 is a fifth width W5.

A sixth position P6 is a certain position between the first center line CL1 and the fourth position P4. A width of the first external shape 210 in the second direction Dr2 at the sixth position P6 is a sixth width W6.

A seventh position P7 is a certain position between the first center line CL1 and the third position P3 in the first direction Dr1. Moreover, the seventh position P7 is set to a position within the connecting portion 213 in the first direction Dr1, that is, a position between a ninth position P9 described below and the first center line CL1. In the present embodiment, the seventh position P7 may be at the same position as the ninth position P9.

An eighth position P8 is a certain position between the first center line CL1 and the fourth position P4 in the first direction Dr1. Moreover, the eighth position P8 is set to a position within the connecting portion 213 in the first direction Dr1, that is, a position between a tenth position P10 described below and the first center line CL1. In the present embodiment, the eighth position P8 may be at the same position as the tenth position P10. A width of the first external shape 210 in the second direction Dr2 at a position located from the seventh position P7 to the eighth position P8 is a fourth width W4. In the present embodiment, the fourth width W4 is substantially constant within the entire connecting portion 213 in the first direction Dr1. Here, "substantially constant" refers to a state of being within ±10% of an average value.

The ninth position P9 is a certain position between the first center line CL1 and the third position P3 in the first direction Dr1. Moreover, the ninth position P9 is a position at which the first arc 211 is coupled to the connecting portion 213. In the present embodiment, a distance r1 between the first external shape 210 and the first center C1 is substantially constant on one side of the first external shape 210 in the first direction Dr1, that is, the −X side, with respect to the ninth position P9. Moreover, the distance r1 is equal to a radius of the first arc 211, that is, half the diameter R1.

The tenth position P10 is a certain position between the first center line CL1 and the fourth position P4 in the first direction Dr1. Moreover, the tenth position P10 is a position at which the second arc 212 is coupled to the connecting portion 213. In the present embodiment, a distance r2 between the first external shape 210 and the second center C2 is substantially constant on the other side of the first external shape 210 in the first direction Dr1, that is, the +X side, with respect to the tenth position P10. Moreover, the distance r2 is equal to a radius of the second arc 212, that is, half the diameter R2.

Widths W1 to W7

The first width W1 is a maximum width of the first external shape 210 in the second direction Dr2 at the third position P3. The first width W1 corresponds to a width of the first arc 211. In the present embodiment, since the first virtual circle VC1 is a perfect circle, the first width W1 matches the diameter R1 of the first virtual circle VC1.

The second width W2 is a maximum width of the first external shape 210 in the second direction Dr2 at the fourth position P4. The second width W2 corresponds to a width of the second arc 212. In the present embodiment, since the second virtual circle VC2 is a perfect circle, the second width W2 matches the diameter R2 of the second virtual circle VC2.

The third width W3 is a width of the first external shape 210 in the second direction Dr2 at the center position Cx of the first external shape 210 in the first direction Dr1. The third width W3 corresponds to a width of the connecting portion 213.

The fourth width W4 is a width of the first external shape 210 in the second direction Dr2 at a position located from the seventh position P7 to the eighth position P8. In the present embodiment, the fourth width W4 is substantially constant from the seventh position P7 to the eighth position P8. Specifically, a maximum value and a minimum value of the fourth width W4 are each within ±10% of an average value of fourth widths W4, from the seventh position P7 to the eighth position P8.

The fifth width W5 is a width of the first external shape 210 in the second direction Dr2 at the fifth position P5. The fifth width W5 corresponds to a width of the first arc 211.

The sixth width W6 is a width of the first external shape 210 in the second direction Dr2 at the sixth position P6. The sixth width W6 corresponds to a width of the second arc 212.

The seventh width W7 is an entire width of the connecting portion 213 in the first direction Dr1 and is equal to a distance from the ninth position P9 to the tenth position P10.

In the first embodiment, the nozzle 200 has the following shape features.

Shape Feature F1

In the first direction Dr1, a first distance D1 between the third position P3 and the fourth position P4 is greater than the first width W1 and greater than the second width W2. Such a shape feature F1 is able to sufficiently increase the distance between the two arcs 211 and 212 and thereby reduce a possibility of liquid landing on the medium PM in a split state. More specifically, due to the capillary force of liquid in the connecting portion 213, a first liquid droplet ejected from the first arc 211 and a second liquid droplet ejected from the second arc 212 are ejected in directions that approach each other and are united, and it is thus possible to suppress liquid landing on the medium PM in a split state. The shape feature also has an advantage of being capable of suppressing curving of the liquid droplet trajectories.

Shape Feature F2

The third width W3 is narrower than the first width W1 and narrower than the second width W2, and the fifth width W5 and the sixth width W6 are wider than the third width W3. According to such a shape feature, since the width of the connecting portion 213 in the second direction Dr2 is sufficiently reduced compared with that of the arcs 211 and 212, it is possible to further reduce a possibility of liquid droplets landing on the medium PM in a split state.

Shape Feature F3

The fourth width W4 at a position located from the seventh position P7 to the eighth position P8 is substantially constant. Here, "substantially constant" refers to a state in which the fourth width W4 is within ±10% of an average value thereof. Such a shape feature is able to further reduce a possibility of liquid droplets landing on the medium PM in a split state.

Shape Feature F4

The distance r1 between the first external shape 210 and the center C1 is substantially constant on one side of the first external shape 210 in the first direction Dr1, that is, the −X side, with respect to the ninth position P9. Similarly, the distance r2 between the first external shape 210 and the second center C2 is substantially constant on the other side of the first external shape 210 in the first direction Dr1, that is, the +X side, with respect to the tenth position P10. Here, "substantially constant" refers to a state in which a value obtained by dividing a minimum value of the distance r1 by a maximum value of the distance r1 is equal to or more than 0.9. The same applies to the distance r2. According to such a shape feature, since the first virtual circle VC1, a portion of the circumference of which is formed by the first arc 211, and the second virtual circle VC2, a portion of the circumference of which is formed by the second arc 212, are each a substantially perfect circle, it is possible to reduce a possibility of liquid droplets landing on the medium PM in a split state.

Shape Feature F5

A value of W1/D1 obtained by dividing the first width W1 by the first distance D1 between the third position P3 and the fourth position P4 is equal to or more than 0.775. Similarly, a value of W2/D1 obtained by dividing the second width W2 by the first distance D1 between the third position P3 and the fourth position P4 is equal to or more than 0.775. Such a shape feature is able to further reduce possible splitting of liquid droplets.

Shape Feature F6

An average value of values W1/W4 obtained by dividing the first width W1 by the fourth width W4, from the seventh position P7 to the eighth position P8, is equal to or more than 2. Similarly, an average value of values W2/W4 obtained by dividing the second width W2 by the fourth width W4, from the seventh position P7 to the eighth position P8, is equal to or more than 2. According to such a shape feature, since a strong capillary force acts, the split liquid is readily united. As a result, it is possible to further reduce a possibility of liquid droplets landing on the medium PM in a split state. The average value of W1/W4 is desirably equal to or more than 3, more desirably equal to or more than 4. Similarly, the average value of W2/W4 is also desirably equal to or more than 3, more desirably equal to or more than 4.

Shape Feature F7

The second distance D2 between the center C1 of the first virtual circle VC1, a portion of the circumference of which is formed by the first arc 211, and the center C2 of the second virtual circle VC2, a portion of the circumference of which is formed by the second arc 212, is longer than the diameter R1 of the first virtual circle VC1, which is measured in the first direction Dr1. Moreover, the widths W3 and W4 of the connecting portion 213, which are measured in the second direction Dr2, are less than the diameter R1 of the first virtual circle VC1, which is measured in the second direction Dr2. Such a shape feature is able to sufficiently increase the second distance D2 serving as the center-to-center distance between the two arcs 211 and 212 and thereby further reduce a possibility of liquid droplets landing on the medium PM in a split state. More specifically, due to the capillary force of liquid in the connecting portion 213, the first liquid droplet ejected from the first arc 211 and the second liquid droplet ejected from the second arc 212 are ejected in directions that approach each other and are united. As a result, it is possible to suppress liquid landing on the medium PM in a split state. It is also possible to reduce ejection deflection. Note that, in the present embodiment, the first distance D1 between the third position P3 and the fourth position P4 is the same as the second distance D2 between the center C1 of the first virtual circle VC1 and the center C2 of the second virtual circle VC2.

Shape Feature F8

The diameter R1 of the first virtual circle VC1, a portion of the circumference of which is formed by the first arc 211, is the same as the diameter R2 of the second virtual circle VC2, a portion of the circumference of which is formed by the second arc 212. According to such a shape feature, since liquid droplets ejected in a split state are readily ejected uniformly, it is possible to suppress curving of the liquid droplet trajectories.

Shape Feature F9

A length of the first arc 211 is the same as a length of the second arc 212. According to such a shape feature, since liquid droplets ejected in a split state are readily ejected uniformly, it is possible to suppress curving of the liquid droplet trajectories.

Shape Feature F10

The first virtual circle VC1, a portion of the circumference of which is formed by the first arc 211, and the second virtual circle VC2, a portion of the circumference of which is formed by the second arc 212, are each a perfect circle. Such a shape feature is able to reduce a possibility of liquid droplets landing on the medium PM in a split state.

Shape Feature F11

The length of the first arc 211 is longer than half a length of the circumference of the first virtual circle VC1, a portion of the circumference of which is formed by the first arc 211. Similarly, the length of the second arc 212 is longer than half a length of the circumference of the second virtual circle VC2, a portion of the circumference of which is formed by the second arc 212. According to such a shape feature, since the two arcs 211 and 212 are able to have a size corresponding to at least half a circle, it is possible to reduce a possibility of liquid droplets landing on the medium PM in a split state.

Shape Feature F12

The connecting portion 213 has a linear shape extending in the first direction Dr1 in which the first arc 211 and the second arc 212 are arranged. Such a shape feature is able to further reduce a possibility of liquid droplets landing on the medium PM in a split state.

Shape Feature F13

A value of R1/D2 obtained by dividing the diameter R1 of the first virtual circle VC1, a portion of the circumference of which is formed by the first arc 211, by the second distance D2 serving as the center-to-center distance between the two arcs 211 and 212 is equal to or more than 0.775. Similarly, a value of R2/D2 obtained by dividing the diameter R2 of the second virtual circle VC2, a portion of the circumference of which is formed by the second arc 212, by the second distance D2 serving as the center-to-center distance between the two arcs 211 and 212 is equal to or more than 0.775. Such a shape feature is able to further reduce a possibility of liquid droplets landing on the medium PM in a split state.

Shape Feature F14

A value obtained by dividing the diameter R1 of the first virtual circle VC1, a portion of the circumference of which is formed by the first arc 211, by the width W4 of the connecting portion 213 in the second direction Dr2 is equal to or more than 2. Similarly, a value obtained by dividing the diameter R2 of the second virtual circle VC2, a portion of the circumference of which is formed by the second arc 212, by the width W4 of the connecting portion 213 in the second direction Dr2 is equal to or more than 2. Such a shape feature is able to further reduce a possibility of liquid droplets landing on the medium PM in a split state. An average value of R1/W4 is desirably equal to or more than 3, more desirably equal to or more than 4. Similarly, an average value of R2/W4 is also desirably equal to or more than 3, more desirably equal to or more than 4.

Shape Feature F15

The second external shape 220 has a size in which the first external shape 210 is included. Such a shape feature is able to further reduce a possibility of liquid droplets landing on the medium PM in a split state. Note that, when the second external shape 220 has an area excessively larger than an area of the first external shape 210, entrainment of air bubbles tends to be readily caused when the meniscus is pulled inward after ejection. To prevent such entrainment of air bubbles, the second external shape 220 desirably has an area two to three times the area of the first external shape 210.

As described above, according to the first embodiment, since the nozzle 200 has the shape features F1 to F15 described above, it is possible to reduce a possibility of liquid droplets landing on the medium PM in a split state. Some of the shape features F1 to F15 described above may be omitted.

B. Other Embodiments

Figure 6:
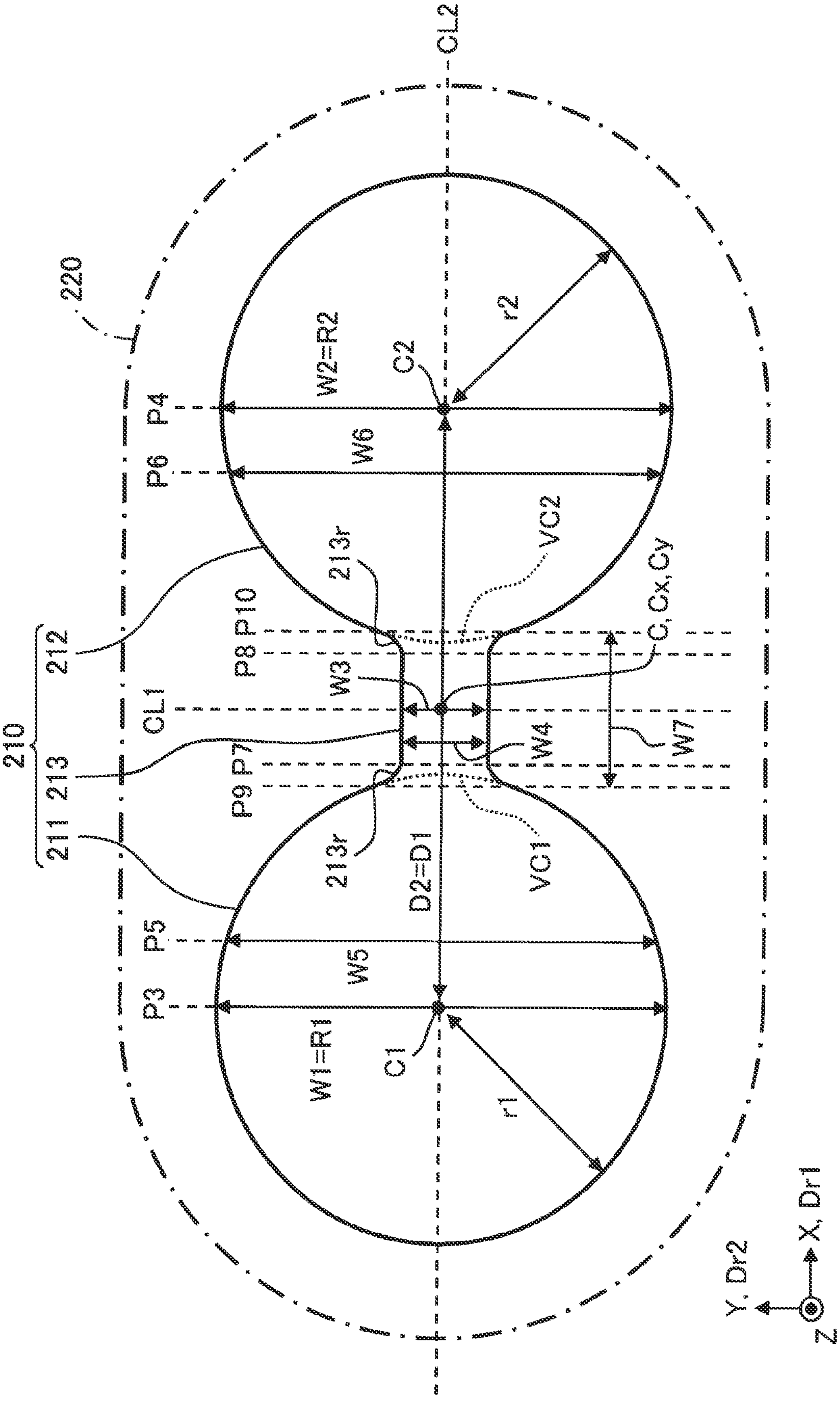
FIG. 6 illustrates a nozzle shape according to a second embodiment.

FIG. 6 illustrates a nozzle shape according to a second embodiment. The second embodiment differs from the first embodiment illustrated in FIG. 5 only in that each end of the connecting portion 213 is not linear but have a curve 213*r*, and the second embodiment is the same as the first embodiment in other configuration. In this manner, the entirety of the connecting portion 213 is not necessarily linear, and a shape of the connecting portion 213 that is partially curved can be also referred to as "linear shape extending in the first direction Dr1". The second embodiment also has the shape features F1 to F15 described above and is thus able to reduce a possibility of liquid droplets landing on the medium PM in a split state, as in the first embodiment. Note that, in the second embodiment, the fifth position P5 may be at the same position as the ninth position P9. Similarly, the sixth position P6 may be at the same position as the tenth position P10.

Figure 7:
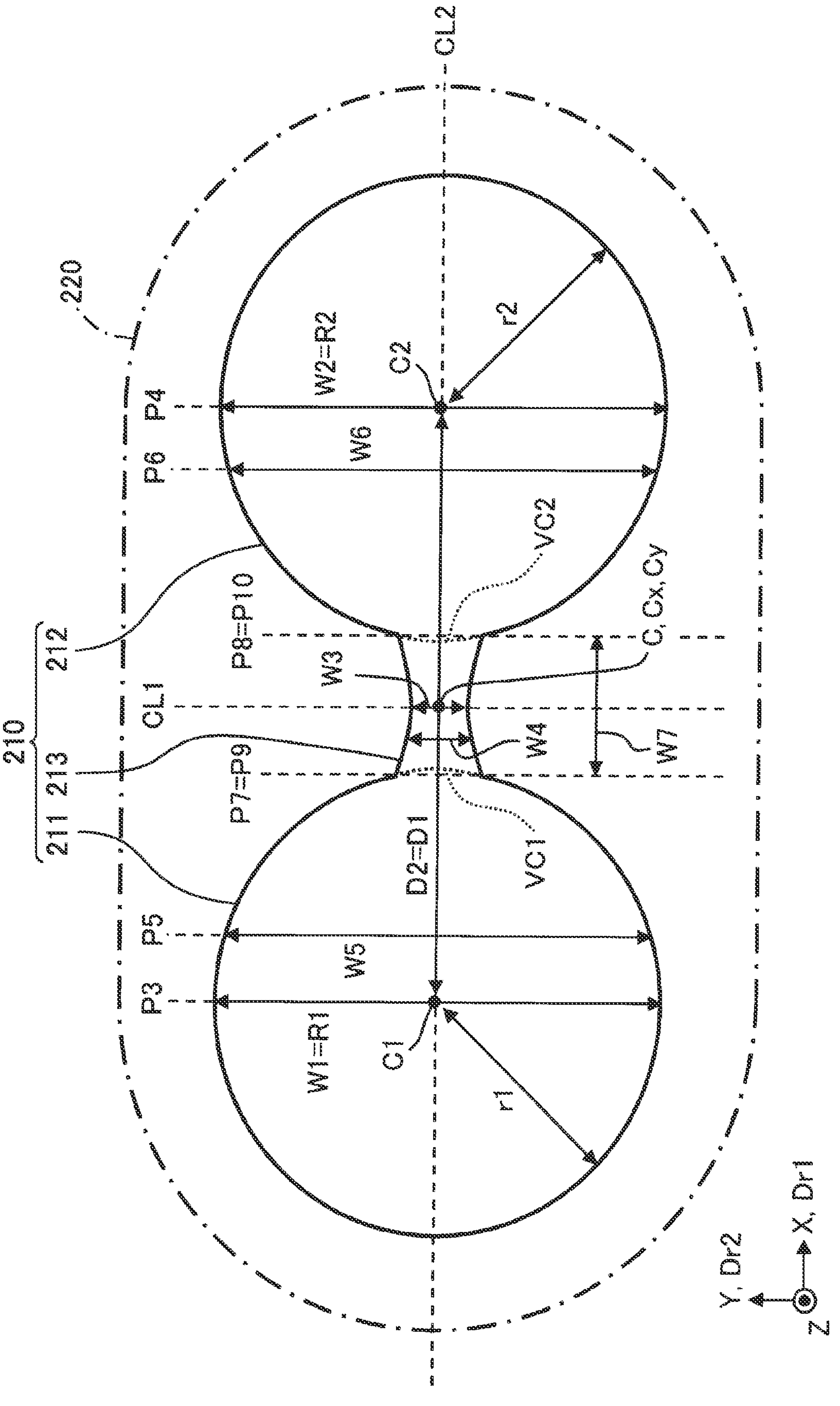
FIG. 7 illustrates a nozzle shape according to a third embodiment.

FIG. 7 illustrates a nozzle shape according to a third embodiment. The third embodiment differs from the first embodiment illustrated in FIG. 5 only in that two sides constituting the connecting portion 213 are curves having a concave shape, and the third embodiment is the same as the first embodiment in other configuration. More specifically, the two sides constituting the connecting portion 213 are curves that are closest to each other in the center of the connecting portion 213 in the first direction Dr1. The third embodiment also has the shape features F1 to F11 and F13 to F15 described above and is thus able to reduce a possibility of liquid droplets landing on the medium PM in a split state.

Figure 8:
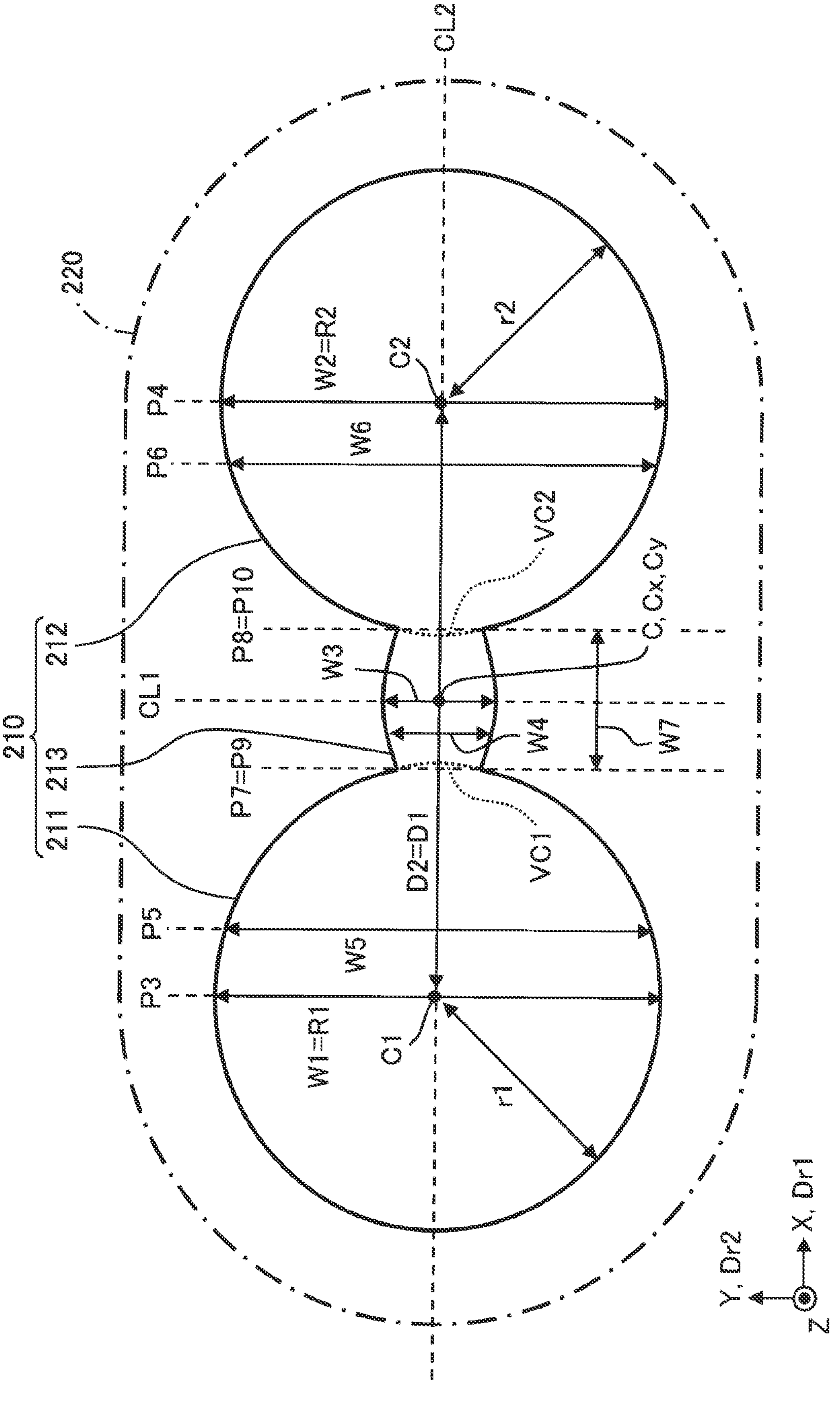
FIG. 8 illustrates a nozzle shape according to a fourth embodiment.

FIG. 8 illustrates a nozzle shape according to a fourth embodiment. The fourth embodiment differs from the first embodiment illustrated in FIG. 5 only in that both the two sides constituting the connecting portion 213 are curves having a convex shape, and the fourth embodiment is the same as the first embodiment in other configuration. More specifically, the two sides constituting the connecting portion 213 are curves that are farthest from each other in the center of the connecting portion 213 in the first direction Dr1. The fourth embodiment also has the shape features F1 to F11 and F13 to F15 described above and is thus able to reduce a possibility of liquid droplets landing on the medium PM in a split state.

Figure 9:
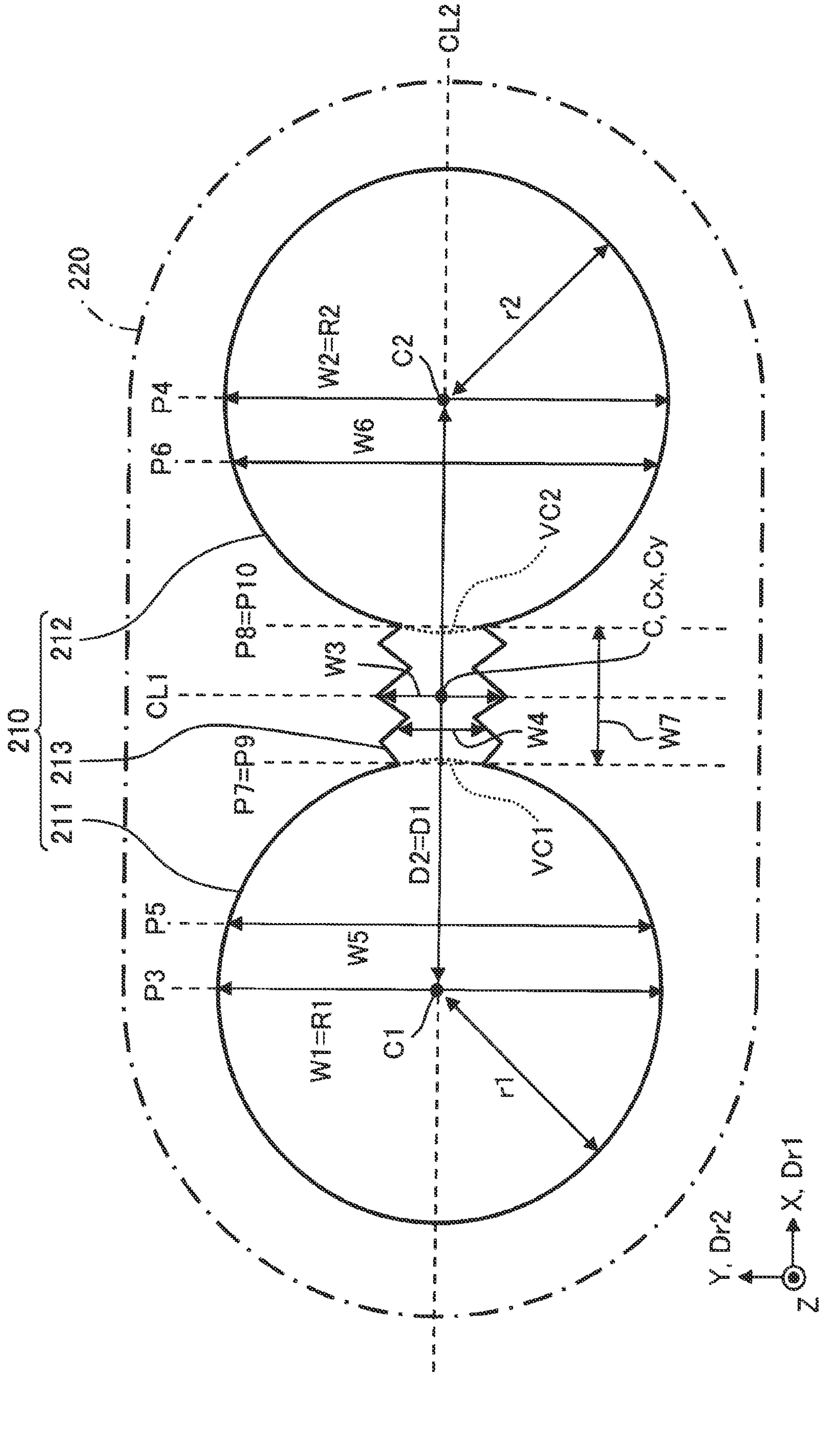
FIG. 9 illustrates a nozzle shape according to a fifth embodiment.

FIG. 9 illustrates a nozzle shape according to a fifth embodiment. The fifth embodiment differs from the first embodiment illustrated in FIG. 5 only in that the two sides constituting the connecting portion 213 are each formed by a jagged line, and the fifth embodiment is the same as the first embodiment in other configuration. The fifth embodiment also has the shape features F1 to F11, F13, and F14 described above and is thus able to reduce a possibility of liquid droplets landing on the medium PM in a split state.

Figure 10:
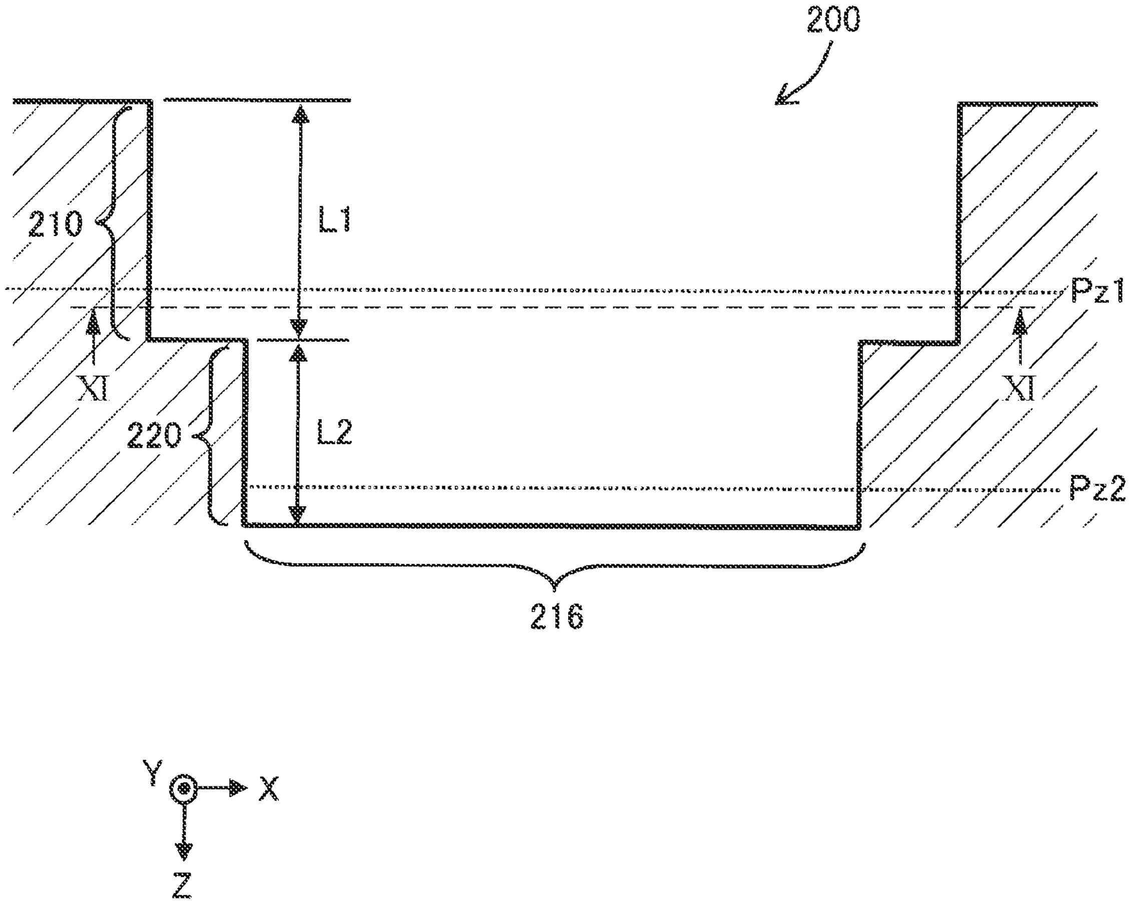
FIG. 10 illustrates a sectional shape of a nozzle according to a sixth embodiment in an enlarged manner.

FIG. 10 illustrates a sectional shape of a nozzle according to a sixth embodiment in an enlarged manner. The sixth embodiment differs from the first embodiment illustrated in FIG. 4 in that the positions of the first portion 210 and the second portion 220 in the ejection direction Z are reversed compared with those in FIG. 4. That is, in FIG. 10, the second portion 220 has the nozzle opening 216, and the first portion 210 is positioned upstream of the second portion 220.

Figure 11:
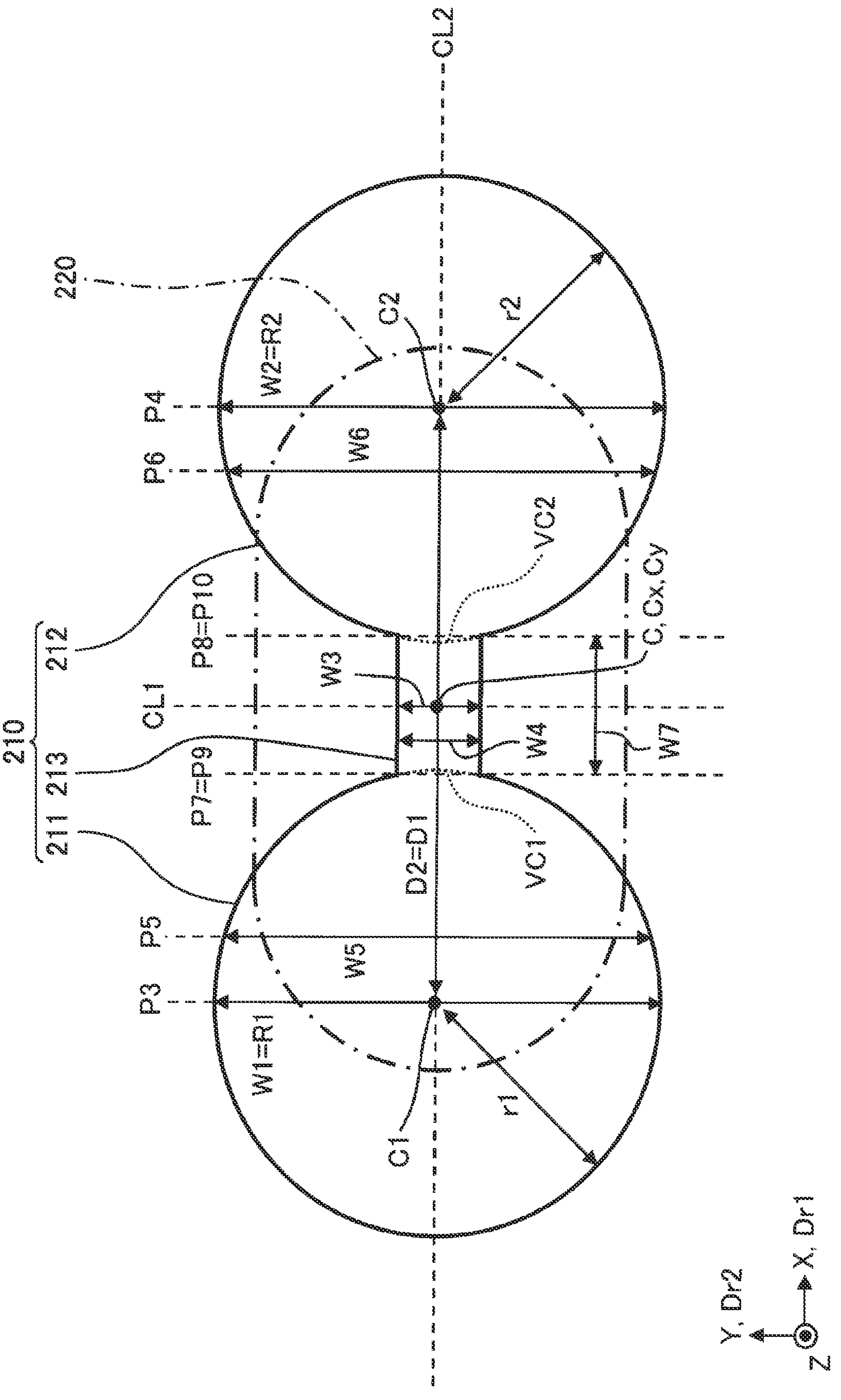
FIG. 11 illustrates a nozzle shape according to the sixth embodiment, which is taken along line XI-XI in FIG. 10.

FIG. 11 illustrates a nozzle shape according to the sixth embodiment, which is taken along line XI-XI in FIG. 10. The sixth embodiment differs from the first embodiment illustrated in FIG. 5 only in that the second external shape 220 is smaller than that in FIG. 5, and the first external shape 210 is the same as that in FIG. 5. The second external shape 220 does not have a size in which the first external shape 210 is included but has an oval shape. In other words, in the sixth embodiment, when a certain position downstream of the first position Pz1 in the nozzle 200 in the ejection direction Z is the second position Pz2, the second external shape 220 at the second portion Pz2 in the nozzle 200 has an oval shape having a longitudinal direction in the first direction Dr1. Such an aspect is also able to reduce, to a certain degree, a possibility of liquid droplets landing on the medium PM in a split state. However, a positional relationship between the first external shape 210 and the second external shape 220 in the ejection direction Z according to the first embodiment described above is more desirable.

Figure 12:
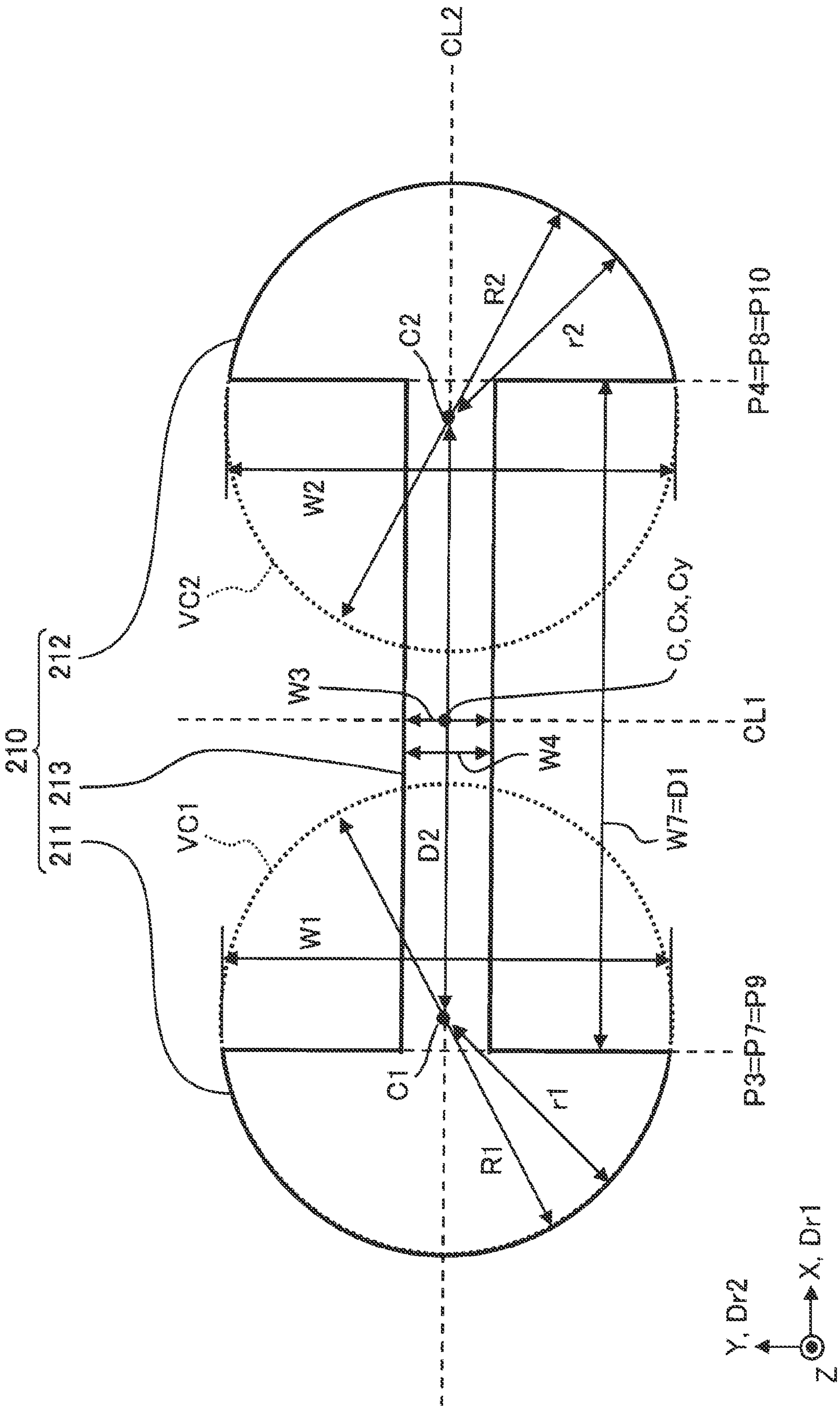
FIG. 12 illustrates a nozzle shape according to a seventh embodiment.

FIG. 12 illustrates a nozzle shape according to a seventh embodiment. Note that, in FIG. 12, the first external shape 210 is illustrated, whereas illustration of the second external shape 220 is omitted. The seventh embodiment differs from the first embodiment illustrated in FIG. 5 in that the two arcs 211 and 212 each have a length less than half the whole circumference thereof. In other words, the first external shape 210 according to the present embodiment does not have positions corresponding to the fifth position P5 and the sixth position P6 as indicated in the first embodiment. The seventh embodiment does not have the shape features F2 and F11 described above but has the other shape features F1, F3 to F10, and F12 to F15. Accordingly, the seventh embodiment is expected to be able to reduce, to a certain degree, a possibility of liquid droplets landing on the medium PM in a split state. However, the two arcs 211 and 212 desirably each have a length longer than half the whole circumference thereof. Note that, in the present embodiment, the first distance D1 between the third position P3 and the fourth position P4 differs from the second distance D2 between the center C1 of the first virtual circle VC1, a portion of the circumference of which is formed by the first arc 211, and the center C2 of the second virtual circle VC2, a portion of the circumference of which is formed by the second arc 212. Specifically, the first distance D1 is longer than the second distance D2 and matches the seventh width W7 serving as the overall width of the connecting portion 213 in the first direction Dr1. Moreover, in the present embodiment, the seventh position P7 may be at the same position as the third position P3, and the eighth position P8 may be at the same position as the fourth position P4.

Figure 13:
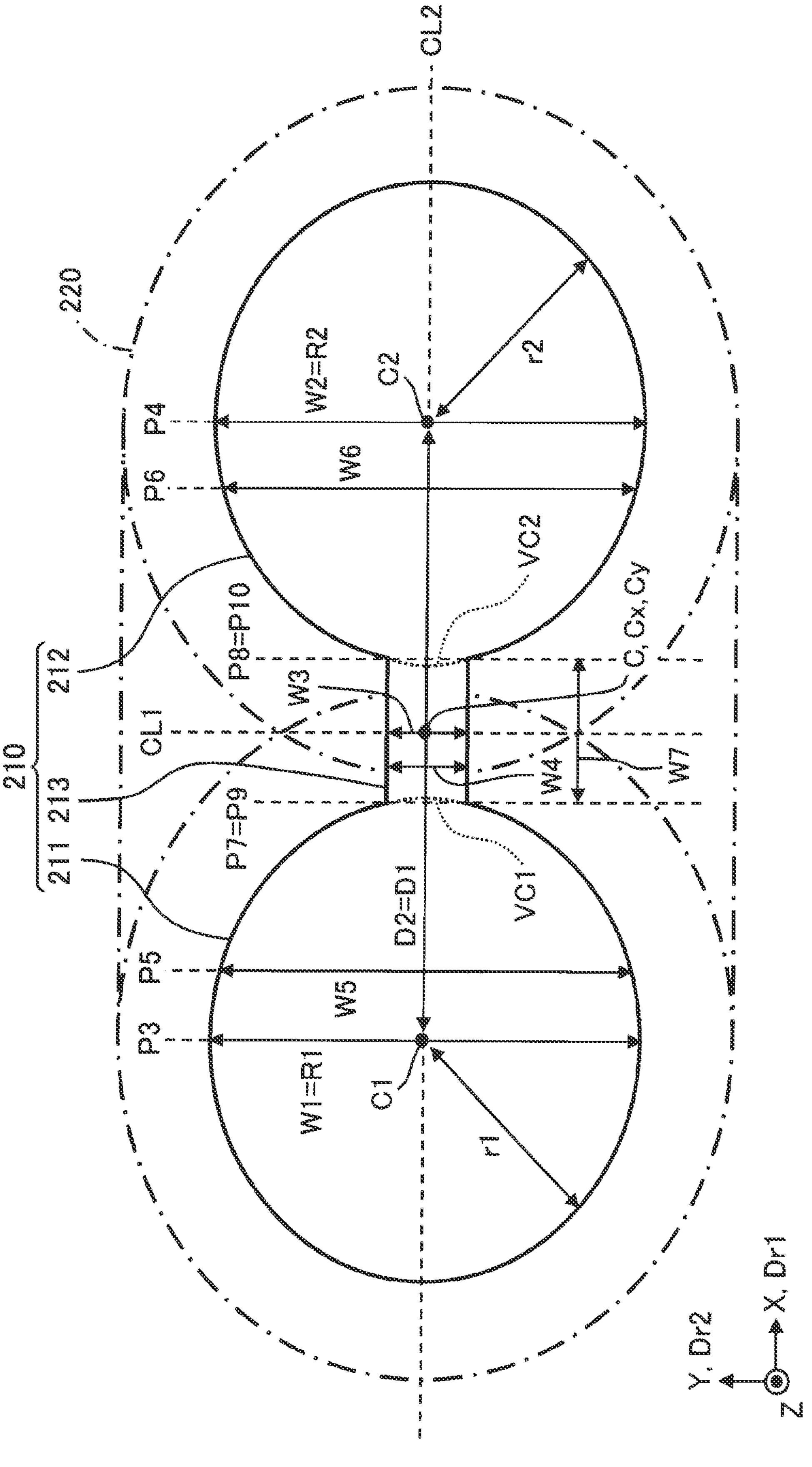
FIG. 13 illustrates a nozzle shape according to an eighth embodiment.

FIG. 13 illustrates a nozzle shape according to an eighth embodiment. In the eighth embodiment, the arcs 211 and 212 are each not a perfect circle but an ellipse, and other than that, the eighth embodiment is substantially the same shape as the first embodiment illustrated in FIG. 5. Note that the diameters of the virtual circles VC1 and VC2 in the first direction Dr1 differ from those in the second direction Dr2 and are longer than those in the second direction Dr2. The eighth embodiment does not have the shape features F4 and F10 described above but has the other shape features F1 to F3, F5 to F9, and F11 to F15. Accordingly, the eighth embodiment is expected to be able to reduce, to a certain degree, a possibility of liquid droplets landing on the medium PM in a split state.

Modified Example 1

Although the liquid ejecting apparatus 400 of a serial type in which the carriage 434 that holds the liquid ejecting head 100 is reciprocated is exemplified in each of the aspects described above, the disclosure is applicable to a liquid ejecting apparatus of a line type in which the plurality of nozzles 200 are distributed over the overall width of the medium PM. That is, the carriage that holds the liquid ejecting head 100 is not limited to a carriage of a serial type and may be a carriage of a line type as a structure that supports the liquid ejecting head 100. In this case, for example, a plurality of liquid ejecting heads 100 are arranged side by side in the width direction of the medium PM and collectively held by a single carriage.

Modified Example 2

The liquid ejecting apparatus exemplified in each of the aspects described above can be adopted for various kinds of equipment, such as a facsimile apparatus and a copying machine, in addition to equipment dedicated to printing. However, the liquid ejecting apparatus is not limited to being used for printing. For example, a liquid ejecting apparatus that ejects a solution of a coloring material is used as a manufacturing apparatus that forms a color filter of a display device such as a liquid crystal display panel. Further, a liquid ejecting apparatus that ejects a solution of a conductive material is used as a manufacturing apparatus that forms a wire and an electrode of a wiring substrate. Moreover, a liquid ejecting apparatus that ejects a solution of an organic substance regarding a living body is used as, for example, a manufacturing apparatus that manufactures a biochip.

Other Aspects

The disclosure is not limited to the embodiments described above and may be implemented in various aspects within a range not departing from the gist of the disclosure. For example, the disclosure may be implemented in the following aspects. To address some or all of the above-described issues of the disclosure or to achieve some or all of the above-described effects of the disclosure, technical features in the embodiments described above corresponding to technical features in the aspects described below can be replaced or combined as appropriate. The technical features can be deleted as appropriate unless the technical features are described as essential in the present specification.

(1) According to a first aspect of the disclosure, a liquid ejecting head including a driving element (301, 302) that generates pressure for ejecting a liquid, and a nozzle (200) that ejects the liquid in an ejection direction (+Z) by the pressure generated by the driving element is provided. A certain position in the nozzle in the ejection direction is a first position (Pz1), a sectional shape of the nozzle in a direction perpendicular to the ejection direction at the first position is a first external shape (210), a longitudinal direction of the first external shape, which is orthogonal to the ejection direction, is a first direction (Dr1), a direction orthogonal to both the ejection direction and the first direction is a second direction (Dr2), and a straight line extending in the second direction and passing through a center (Cx) of the first external shape in the first direction is a first center line (CL1). A first width (W1) corresponding to a maximum width in the second direction in a portion of the first external shape on one side (−X side) in the first direction with respect to the first center line is at a third position (P3) serving as a certain position in the first direction, a second width (W2) corresponding to a maximum width in the second direction in a portion of the first external shape on the other side (+X side) in the first direction with respect to the first center line is at a fourth position (P4) serving as a certain position in the first direction, and a first distance (D1) between the third position and the fourth position in the first direction is greater than the first width and greater than the second width.

(2) In the liquid ejecting head, a third width (W3) corresponding to a width of the first external shape in the second direction at the center in the first direction may be narrower than the first width and narrower than the second width, a fifth width (W5) corresponding to a width of the first external shape in the second direction at a fifth position (P5) serving as a certain position between the first center line and the third position may be wider than the third width, and a sixth width (W6) corresponding to a width of the first external shape in the second direction at a sixth position (P6) serving as a certain position between the first center line and the fourth position may be wider than the third width.

(3) In the liquid ejecting head, a certain position between the first center line and the third position in the first direction may be a seventh position (P7), a certain position between the first center line and the fourth position in the first direction may be an eighth position (P8), and a fourth width (W4) corresponding to a width of the first external shape in the second direction at a position located from the seventh position to the eighth position may be substantially constant.

(4) In the liquid ejecting head, a certain position between the first center line and the third position in the first direction may be a ninth position (P9), a certain position between the first center line and the fourth position in the first direction may be a tenth position (P10), a distance (r1) between the first external shape and a first center (C1) of the first width may be substantially constant on the one side of the first external shape in the first direction with respect to the ninth position, and a distance (r2) between the first external shape and a second center (C2) of the second width may be substantially constant on the other side of the first external shape in the first direction with respect to the tenth position.

(5) In the liquid ejecting head, a value obtained by dividing the first width by the first distance may be equal to or more than 0.775.

(6) In the liquid ejecting head, a certain position between the first center line and the third position in the first direction may be a seventh position (P7), a certain position between the first center line and the fourth position in the first direction may be an eighth position (P8), a width of the first external shape in the second direction at a position located from the seventh position to the eighth position may be a fourth width (W4), and an average value of values obtained by dividing the first width by the fourth width, from the seventh position to the eighth position, may be equal to or more than 2.

(7) According to a second aspect of the disclosure, a liquid ejecting head including a driving element (301, 302) that generates pressure for ejecting a liquid, and a nozzle (200) that ejects the liquid in an ejection direction (+Z) by the pressure generated by the driving element is provided. A certain position in the nozzle in the ejection direction is a first position (Pz1), and a sectional shape of the nozzle in a direction perpendicular to the ejection direction at the first position is a first external shape (210). The first external shape includes a first arc (211), a second arc (212), and a connecting portion (213) that couples the first arc and the second arc. A second distance (D2) between a center (C1) of a first virtual circle (VC1) of a perfect circle or an ellipse, a portion of a circumference of which is formed by the first arc, and a center (C2) of a second virtual circle (VC2) of a perfect circle or an ellipse, a portion of a circumference of which is formed by the second arc, is greater than a diameter (R1=W1) of the first virtual circle, which is measured in a first direction (Dr1) in which the first arc and the second arc are arranged, and a width (W3 or W4) of the connecting portion, which is measured in a second direction (Dr2) orthogonal to both the first direction and the ejection direction, is less than a diameter of the first virtual circle, which is measured in the second direction.

(8) In the liquid ejecting head, each of the first virtual circle and the second virtual circle may be a perfect circle.

(9) In the liquid ejecting head, a length of the first arc may be longer than half a length of the circumference of the first virtual circle, and a length of the second arc may be longer than half a length of the circumference of the second virtual circle.

(10) In the liquid ejecting head, the connecting portion may have a linear shape extending in the first direction (Dr1) in which the first arc and the second arc are arranged.

(11) In the liquid ejecting head, a value obtained by dividing the diameter of the first virtual circle by the second distance may be equal to or more than 0.775.

(12) In the liquid ejecting head, a value obtained by dividing the diameter of the first virtual circle by a width (W4) of the connecting portion in the second direction may be equal to or more than 2.

(13) In the liquid ejecting head, a certain position upstream of the first position in the nozzle in the ejection direction may be a second position (Pz2), a sectional shape of the nozzle in the direction perpendicular to the ejection direction at the second position may be a second external shape (220) different from the first external shape, and the second external shape may have a size in which the first external shape is included.

(14) In the liquid ejecting head, a certain position downstream of the first position in the nozzle in the ejection direction may be a second position (Pz2), a sectional shape of the nozzle in the direction perpendicular to the ejection direction at the second position may be a second external shape (220) different from the first external shape, and the second external shape may have an oval shape in which a longitudinal direction is the first direction.

(15) The liquid ejecting head may further include a first pressure chamber (131), a second pressure chamber (132), and a communication channel (134) extending in the first direction, through which the first pressure chamber and the second pressure chamber communicate. The nozzle may be provided halfway in the communication channel, and the driving element may include a first driving element (301) for the first pressure chamber and a second driving element (302) for the second pressure chamber.

(16) In the liquid ejecting head, the liquid to be supplied to the nozzle may have a viscosity of 20 mPa·s or less at 25° C.

(17) A third aspect of the disclosure includes the liquid ejecting head (100) and a liquid tank (420) in which the liquid to be supplied to the liquid ejecting head is stored.

The disclosure can also be realized in various aspects other than the liquid ejecting head and the liquid ejecting apparatus. For example, the disclosure can be realized in aspects such as a method of manufacturing the liquid ejecting head and the liquid ejecting apparatus, a method for controlling the liquid ejecting head and the liquid ejecting apparatus, a computer program realizing the control method, a non-transitory recording medium in which the computer program is recorded.

What is claimed is:

1. A liquid ejecting head comprising:

a nozzle plate including a plurality of nozzles, the plurality of nozzles penetrating the nozzle plate and include a first nozzle configured to eject a liquid in an ejection direction;

a communication plate that includes a first coupling channel connected to the first nozzle and that is disposed on a surface of the nozzle plate facing a direction that is opposite to the ejection direction, the first coupling channel including a first pressure chamber; and a first driving element located in the direction that is opposite to the ejection direction with respect to the first pressure chamber and configured to generate pressure in the first pressure chamber for ejecting the liquid from the first nozzle, wherein a certain position in the first nozzle regarding the ejection direction is a first position, a sectional shape of the first nozzle perpendicular to the ejection direction at the first position is a first external shape, a longitudinal direction of the first external shape, which is orthogonal to the ejection direction, is a first direction, a direction orthogonal to both the ejection direction and the first direction is a second direction, a straight line extending in the second direction and passing through a center of the first external shape regarding the first direction is a first center line, a first width corresponding to a maximum width regarding the second direction in a portion of the first external shape on one side in the first direction with respect to the first center line is at a third position serving as a certain position regarding the first direction, a second width corresponding to a maximum width regarding the second direction in a portion of the first external shape on an other side in the first direction with respect to the first center line is at a fourth position serving as a certain position regarding the first direction, a first distance between the third position and the fourth position regarding the first direction is greater than the first width and greater than the second width, wherein a value obtained by dividing the first width by the first distance is equal to or more than 0.775, a third width corresponding to a width of the first external shape regarding the second direction at the center regarding the first direction is narrower than the first width and narrower than the second width, a fifth width corresponding to a width of the first external shape regarding the second direction at a fifth position serving as a certain position between the first center line and the third position is wider than the third width, a sixth width corresponding to a width of the first external shape regarding the second direction at a sixth position serving as a certain position between the first center line and the fourth position is wider than the third width, the first external shape includes a connecting portion located between the third position and the fourth position, the connecting portion having a fourth width in the second direction, the fourth width being substantially constant within the entire connecting portion in the first direction, and a seventh width that is an entire width of the connecting portion in the first direction is narrower than the first width and narrower than the second width.

2. The liquid ejecting head according to claim 1, wherein a certain position between the first center line and the third position regarding the first direction is a seventh position a certain position between the first center line and the fourth position regarding the first direction is an eighth position, and a fourth width corresponding to a width of the first external shape regarding the second direction at a position located from the seventh position to the eighth position is substantially constant.

3. The liquid ejecting head according to claim 1, wherein a certain position between the first center line and the third position regarding the first direction is a ninth position, a certain position between the first center line and the fourth position regarding the first direction is a tenth position, a distance between the first external shape and a first center of the first width is substantially constant on the one side of the first external shape in the first direction with respect to the ninth position, and a distance between the first external shape and a second center of the second width is substantially constant on the other side of the first external shape in the first direction with respect to the tenth position.

4. The liquid ejecting head according to claim 1, wherein a certain position between the first center line and the third position regarding the first direction is a seventh position, a certain position between the first center line and the fourth position regarding the first direction is an eighth position, a width of the first external shape regarding the second direction at a position located from the seventh position to the eighth position is a fourth width, and an average value of values obtained by dividing the first width by the fourth width, from the seventh position to the eighth position, is equal to or more than 2.

5. The liquid ejecting head according to claim 1, wherein a certain position upstream of the first position in the first nozzle regarding the ejection direction is a second position, a sectional shape of the first nozzle perpendicular to the ejection direction at the second position is a second external shape different from the first external shape, and the second external shape has a size in which the first external shape is included.

6. The liquid ejecting head according to claim 1, wherein a certain position downstream of the first position in the first nozzle regarding the ejection direction is a second position, a sectional shape of the first nozzle perpendicular to the ejection direction at the second position is a second external shape different from the first external shape, and the second external shape has an oval shape in which a longitudinal direction is the first direction.

7. The liquid ejecting head according to claim 1, further comprising a second driving element, wherein the first coupling channel includes a second pressure chamber;

the second driving element is configured to generate pressure in the second pressure chamber for ejecting the liquid from the first nozzle and is located in the direction that is opposite to the ejection direction with respect to the second pressure chamber; and a communication channel extending in the first direction, through which the first pressure chamber and the second pressure chamber communicate, wherein the first nozzle is provided halfway in the communication channel, and a flow direction of liquid flowing through the communication channel from the first pressure chamber to the second pressure chamber is the first direction.

8. The liquid ejecting head according to claim 1, wherein the liquid to be supplied to the first nozzle has a viscosity of 20 mPa·s or less at 25° C.

9. A liquid ejecting apparatus comprising:

the liquid ejecting head according to claim 1, and a liquid tank in which the liquid to be supplied to the liquid ejecting head is stored.

10. A liquid ejecting apparatus comprising:

the liquid ejecting head according to claim 1, and a liquid tank in which the liquid to be supplied to the liquid ejecting head is stored.

11. A liquid ejecting head comprising:

a nozzle plate including a plurality of nozzles, the plurality of nozzles penetrating the nozzle plate and including a first nozzle configured to eject a liquid in an ejection direction;

a communication plate that includes a first coupling channel connected to the first nozzle and that is disposed on a surface of the nozzle plate facing a direction that is opposite to the ejection direction, the first coupling channel including a first pressure chamber, a second pressure chamber, and a communication channel;

a first driving element located in the direction that is opposite to the ejection direction with respect to the first pressure chamber and configured to generate pressure in the first pressure chamber for ejecting the liquid from the first nozzle; and a second driving element located in the direction that is opposite to the ejection direction with respect to the second pressure chamber and configured to generate pressure in the second pressure chamber for ejecting the liquid from the first nozzle, wherein the communication channel extends in a first direction, through which the first pressure chamber and the second pressure chamber communicate, the first nozzle is provided halfway in the communication channel, a certain position in the first nozzle regarding the ejection direction is a first position, a sectional shape of the first nozzle perpendicular to the ejection direction at the first position is a first external shape, a longitudinal direction of the first external shape, which is orthogonal to the ejection direction, is the first direction, a direction orthogonal to both the ejection direction and the first direction is a second direction, a straight line extending in the second direction and passing through a center of the first external shape regarding the first direction is a first center line, a first width corresponding to a maximum width regarding the second direction in a portion of the first external shape on one side in the first direction with respect to the first center line is at a third position serving as a certain position regarding the first direction, a second width corresponding to a maximum width regarding the second direction in a portion of the first external shape on an other side in the first direction with respect to the first center line is at a fourth position serving as a certain position regarding the first direction, a first distance between the third position and the fourth position regarding the first direction is greater than the first width and greater than the second width, and a flow direction of liquid flowing through the communication channel from the first pressure chamber to the second pressure chamber is the first direction.

12. A liquid ejecting head comprising:

a nozzle plate including a plurality of nozzles, the plurality of nozzles penetrating the nozzle plate and including a first nozzle configured to eject a liquid in an ejection direction;

a communication plate that includes a first coupling channel connected to the first nozzle and that is disposed on a surface of the nozzle plate facing a direction that is opposite to the ejection direction, the first coupling channel including a first pressure chamber; and a first driving element located in the direction that is opposite to the ejection direction with respect to the first pressure chamber and configured to generate pressure in the first pressure chamber for ejecting the liquid from the first nozzle, wherein a certain position in the first nozzle regarding the ejection direction is a first position, a sectional shape of the first nozzle perpendicular to the ejection direction at the first position is a first external shape, a longitudinal direction of the first external shape, which is orthogonal to the ejection direction, is a first direction, a direction orthogonal to both the ejection direction and the first direction is a second direction, a straight line extending in the second direction and passing through a center of the first external shape regarding the first direction is a first center line, a first width corresponding to a maximum width regarding the second direction in a portion of the first external shape on one side in the first direction with respect to the first center line is at a third position serving as a certain position regarding the first direction, a second width corresponding to a maximum width regarding the second direction in a portion of the first external shape on an other side in the first direction with respect to the first center line is at a fourth position serving as a certain position regarding the first direction, a certain position between the first center line and the third position regarding the first direction is a seventh position, a certain position between the first center line and the fourth position regarding the first direction is an eighth position, a fourth width corresponding to a width of the first external shape regarding the second direction at a position located from the seventh position to the eighth position is substantially constant, the first external shape includes a first portion of the first external shape on the one side in the first direction with respect to the seventh position and a second portion on the other side in the first direction with respect to the eighth position, and a first distance between the third position and the fourth position regarding the first direction is greater than the first width and greater than the second width such that a first liquid droplet ejected from the first portion and a second liquid droplet ejected from the second portion are ejected in directions that approach each other and are united before liquid landing on a medium.

* * * * *